United States Patent
Rousseau et al.

(10) Patent No.: US 11,360,331 B2
(45) Date of Patent: Jun. 14, 2022

(54) MULTIFUNCTIONAL DEVICE FOR AN OPHTHALMIC LENS

(71) Applicant: Essilor International, Charenton-le-Pont (FR)

(72) Inventors: Denis Rousseau, Charenton le Pont (FR); Denis Cohen Tannoudji, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 219 days.

(21) Appl. No.: 16/625,243

(22) PCT Filed: Jun. 21, 2018

(86) PCT No.: PCT/EP2018/066689
§ 371 (c)(1),
(2) Date: Dec. 20, 2019

(87) PCT Pub. No.: WO2018/234515
PCT Pub. Date: Dec. 27, 2018

(65) Prior Publication Data
US 2020/0142219 A1    May 7, 2020

(30) Foreign Application Priority Data
Jun. 22, 2017   (EP) .................................... 17305769

(51) Int. Cl.
*G02C 7/10*    (2006.01)
*G02C 7/08*    (2006.01)

(52) U.S. Cl.
CPC ............. *G02C 7/101* (2013.01); *G02C 7/083* (2013.01)

(58) Field of Classification Search
CPC ........ G02C 7/101; G02C 7/083; G02C 7/105; G02C 2202/16
USPC ...................... 351/41, 159.01, 159.6, 159.62
See application file for complete search history.

(56) References Cited

U.S. PATENT DOCUMENTS

| | | | |
|---|---|---|---|
| 5,657,150 A | 8/1997 | Kallman et al. | |
| 6,619,799 B1 | 9/2003 | Blum et al. | |
| 7,195,353 B2 * | 3/2007 | Blum ..................... | G02B 26/06 351/159.03 |
| 9,323,074 B1 | 4/2016 | Blum et al. | |
| 9,411,173 B1 | 8/2016 | Blum et al. | |
| 2004/0051846 A1 | 3/2004 | Blum et al. | |
| 2004/0056986 A1 | 3/2004 | Blum et al. | |
| 2005/0036109 A1 | 2/2005 | Blum et al. | |
| 2005/0168687 A1 | 8/2005 | Blum et al. | |

(Continued)

FOREIGN PATENT DOCUMENTS

| | | |
|---|---|---|
| CN | 1662172 A | 8/2005 |
| WO | WO 95/19588 A2 | 7/1995 |

(Continued)

OTHER PUBLICATIONS

International Search Report and Written Opinion dated Sep. 14, 2018 in PCT/EP2018/066689 filed Jun. 21, 2018.

*Primary Examiner* — Tuyen Tra
(74) *Attorney, Agent, or Firm* — Oblon, McClelland, Maier & Neustadt, L.L.P.

(57) ABSTRACT

A multifunctional device for an ophthalmic lens or ophthalmic lens blank, comprising an electrochromic layered module and an ophthalmic power layered module, both modules being on the same support layer.

18 Claims, 4 Drawing Sheets

(56) References Cited

U.S. PATENT DOCUMENTS

| | | |
|---|---|---|
| 2005/0206844 A1 | 9/2005 | Blum et al. |
| 2005/0213027 A1 | 9/2005 | Blum et al. |
| 2005/0219460 A1 | 10/2005 | Blum et al. |
| 2006/0139570 A1 | 6/2006 | Blum et al. |
| 2006/0192918 A1 | 8/2006 | Blum |
| 2006/0238701 A1 | 10/2006 | Blum |
| 2007/0081126 A1 | 4/2007 | Blum et al. |
| 2007/0091258 A1 | 4/2007 | Blum et al. |
| 2007/0146627 A1 | 6/2007 | Blum et al. |
| 2007/0216862 A1 | 9/2007 | Blum et al. |
| 2007/0216864 A1 | 9/2007 | Blum et al. |
| 2008/0024718 A1 | 1/2008 | Blum et al. |
| 2008/0174732 A1 | 7/2008 | Blum et al. |
| 2008/0239236 A1 | 10/2008 | Blum et al. |
| 2008/0316425 A1 | 12/2008 | Blum et al. |
| 2009/0033866 A1 | 2/2009 | Blum et al. |
| 2009/0079938 A1 | 3/2009 | Blum et al. |
| 2011/0037946 A1 | 2/2011 | Blum et al. |
| 2011/0279772 A1 | 11/2011 | Blum et al. |
| 2012/0008094 A1 | 1/2012 | Blum et al. |
| 2013/0250191 A1 | 9/2013 | Blum et al. |
| 2014/0036226 A1 | 2/2014 | Blum et al. |
| 2014/0198128 A1 | 7/2014 | Hong et al. |
| 2014/0218647 A1 | 8/2014 | Blum et al. |
| 2016/0192836 A1 | 7/2016 | Blum et al. |
| 2016/0282694 A1 | 9/2016 | Biver et al. |
| 2016/0363783 A1 | 12/2016 | Blum et al. |
| 2017/0010480 A1 | 1/2017 | Blum et al. |
| 2017/0307905 A1 | 10/2017 | Blum et al. |
| 2018/0095279 A1 | 4/2018 | Bouchier et al. |

FOREIGN PATENT DOCUMENTS

| | | |
|---|---|---|
| WO | WO 03/090611 A1 | 11/2003 |
| WO | 2 848 669 A1 | 3/2015 |
| WO | WO 2016/156614 A1 | 10/2016 |

\* cited by examiner

MULTIFUNCTIONAL DEVICE FOR AN OPHTHALMIC LENS

TECHNICAL FIELD

The present invention relates to the technical field of ophthalmic lenses with active functions such as electrochromic and ophthalmic power functions. More specifically, the present invention relates to multifunctional device for an ophthalmic lens or ophthalmic lens blank with an electrochromic layered module and an ophthalmic power layered module.

PRIOR ART

Compared with plain ophthalmic lenses, ophthalmic lenses with active functions are adaptable to conditions or purpose of use.

For example, in comparison with a photochromic ophthalmic lens which provides a darkening thereof when exposed to UV rays, an electrochromic ophthalmic lens makes it possible to provide a darkening thereof, so that darkening may be tuned to the environment of the wearer independently from the presence of UV rays.

Another example is an ophthalmic lens with an ophthalmic power module that divides the surface of the ophthalmic lens into portions and tunes the ophthalmic power in each portion to the need of the wearer. Thus, the ophthalmic lens may follow the evolution of the wearer's vision or be adapted to the activity of the wearer such as reading versus watching a screen versus looking at far distance. The ophthalmic lens may also be used by multiple persons with different correction needs.

Active functions may even be combined to enhance the adaptability of the ophthalmic lens. For example, US 20050036109 describes an ophthalmic lens with multiple active functions.

Unfortunately, the ophthalmic lens described therein is bulky because each active function necessitates one glass substrate to support it.

Further, especially for the application requiring the provision of an LCD and an electrochromic functions on a same ophthalmic lens, assembly may be quite burdensome due to the need of a precise alignment between two elements that are manufactured separately. Shaping of the ophthalmic lens may also become difficult.

Thus, there is still a need to provide a handier ophthalmic lens with multiple active functions which is easier to manufacture.

SUMMARY OF THE INVENTION

One aim of the invention is to overcome one drawback of the prior art.

To this aim, the invention provides a multifunctional device for an ophthalmic lens or ophthalmic lens blank, comprising a support layer, an electrochromic layered module and an ophthalmic power layered module, wherein
- a part of one face of the support layer, called EC part, forms part of the electrochromic layered module, and
- a part of one face of the support layer, called OP part, forms part of the ophthalmic power layered module, and wherein the support layer comprises electric connections to the electrochromic layered module and the ophthalmic power layered module.

Thanks to the multifunctional device of the present invention, ophthalmic lenses or ophthalmic lens blanks with multifunctional active functions may be made lighter; indeed, a single substrate supports both functions. Also, thickness is reduced. It is possible to create required complex printed pattern only on one or both side of the support layer, easing the manufacturing process because only one element needs to be handled. Because the support layer may be patterned on both its faces, the alignment, which sometime may require micrometric precise and/or accurate, may be carried out directly during patterning thus facilitating any subsequent handling.

Other optional and non-limiting features of the multifunctional device are as follows.

The EC-part-bearing face of the support layer and the OP-part-bearing face of the support layer may be opposite faces of the support layer.

The electrochromic layered module may further comprise a continuous transparent conductive layer directly in contact with the EC part. In which case, the electrochromic layered module may further comprise a liquid crystal layer directly on the continuous transparent conductive layer, a second continuous transparent conductive layer directly on the liquid crystal layer, and a protective layer directly on the second continuous transparent conductive layer.

The ophthalmic power layered module may comprise a transparent conductive layer comprising transparent conductive strips oriented in a first direction directly in contact with the OP part. In which case, the ophthalmic power layered module may further comprise a second transparent conductive layer comprising transparent conductive strips oriented in a second direction perpendicular to the first direction, a liquid crystal layer directly between both transparent conductive layers comprising transparent conductive strips, the liquid crystal layer also filling the space between the strips, and a protective layer directly on the second transparent conductive layer comprising transparent conductive strips.

The electric connections may be provided on at least one side edge of the support layer.

The electrochromic layered module may further comprise a printed light sensor. In which case, the electrochromic layered module may further comprise a processor connected to the light sensor. Additional or alternatively, the ophthalmic power layered module may further comprise a controller connected to the light sensor of the electrochromic layered module which is adapted to control the ophthalmic power according to the light received by the light sensor. In this latter case, the controller may be connected to the light sensor through the electric connections of the support layer.

The invention also provides an ophthalmic lens or ophthalmic lens blank comprising the multifunctional device described above. The side edge of the support layer may be flush with the side edge of the ophthalmic lens or ophthalmic lens blank.

The invention also provides a spectacle comprising at least one ophthalmic lens described above.

The invention further provides a method for manufacturing a multifunctional device described above. The method comprises:
- providing an electrochromic layered module onto a part of one face of the support layer; and
- providing an ophthalmic power layered module onto a part of one face of the support layer.

DRAWINGS

In the following, MF means "multifunctional device", ECL means "electrochromic layered" and OPL means "ophthalmic power layered".

Other aim, features and advantages will become more apparent upon reading the following exemplary description in reference to the illustrating and non-limiting drawings, amongst which.

DESCRIPTION

In the whole description and claims, the words "front", "back", "up", "low" and their words derived therefrom are to be understood with reference to the position of the eye of the user of the MF device. Thus, "front" in opposition to "back" designates a position that is farther from the eye of the user, while "back" is closer. Similarly, "up" designates a position that is closer to the upper lid, while "low" is closer to the lower lid.

A multifunctional device (hereafter MF device) 1 for an ophthalmic lens or ophthalmic lens blank will be described hereafter in reference to FIGS. 1 to 14.

The MF device 1 comprises a support layer 2, an electrochromic layered module (ECL module) 3 and an ophthalmic power layered module (OPL module) 4. The MF device 1 may either be fixed or embedded into an ophthalmic substrate 5, that is to say a substrate suitable for making ophthalmic lens, for example a glass substrate or a plastic substrate. Alternatively, the support layer 2 of the MF device 1 may be the ophthalmic substrate itself.

The ECL module 3 enables the MF device 1 to darken or to brighten.

The OPL module 4 enables the MF device 1 to provide ophthalmic correction to the wearer or a display function.

Unlike the prior art, a part (hereafter EC part for "electrochromic part") of one face of the support layer 2 forms part of the ECL module 3, and a part (hereafter OP part for "ophthalmic power part") of one face of the support layer 2 forms part of the OPL module 4. Although it is referred in the following to one EC part and to one OP part, the singular must be understood as encompassing the plural. Thus, a plurality of EC parts may be provided on one face of the support layer and positioned at desired locations. Their size may be various: wide or small. In the latter case, they may be scattered over a portion of the corresponding face of the support layer. In this same manner, a plurality of OP parts may be provided on one face of the support layer and positioned at desired locations. Their size may also be various: wide or small. In this latter case, they may also be scattered over a portion of the corresponding face of the support layer.

Figure 1:
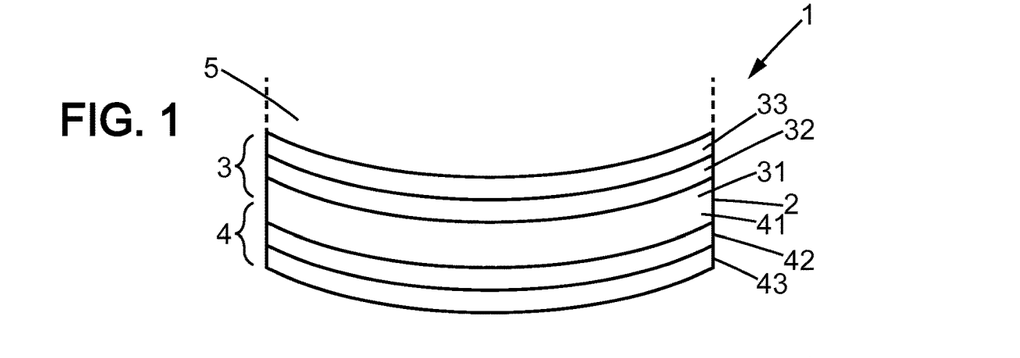
FIG. 1 is a cross section of a MF device according to the invention wherein the ECL module and the OPL module are formed at opposite faces of the support layer, wherein the ECL module is attached to an ophthalmic lens or ophthalmic lens blank.
Figure 2:
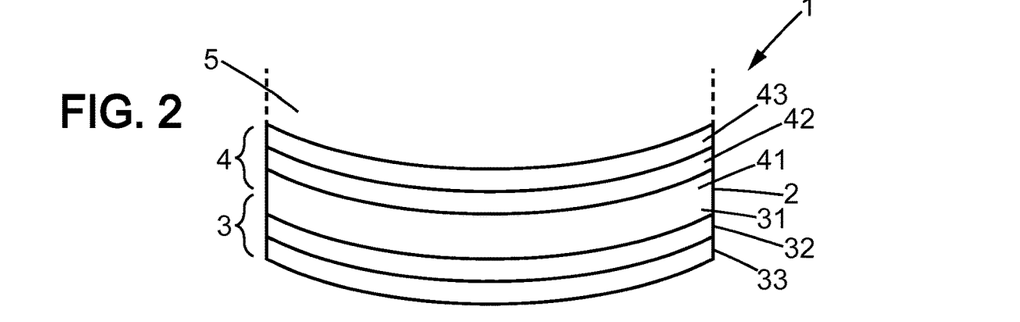
FIG. 2 is a cross section of a MF device according to the invention wherein the ECL module and the OPL module are formed at opposite faces of the support layer, wherein the OPL module is attached to an ophthalmic lens or ophthalmic lens blank.
Figure 3:
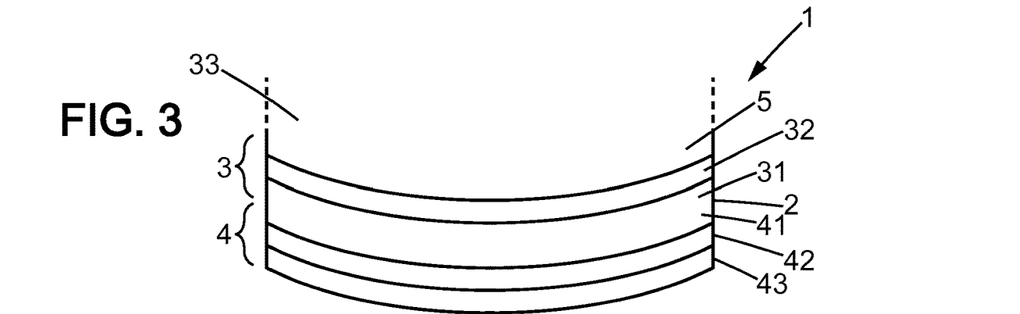
FIG. 3 is a cross section of a MF device according to the invention wherein the ECL module and the OPL module are formed at opposite faces of the support layer, wherein the end layer of the ECL module not formed by the support layer is an ophthalmic lens or ophthalmic lens blank.
Figure 4:
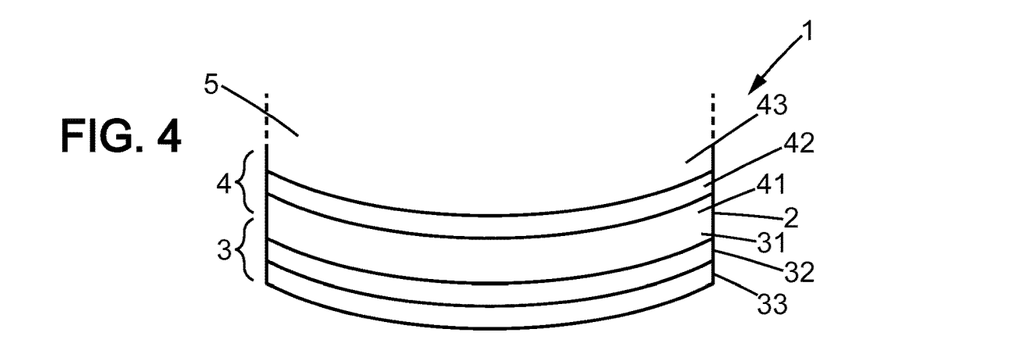
FIG. 4 is a cross section of a MF device according to the invention wherein the ECL module and the OPL module are formed at opposite faces of the support layer, wherein the end layer of the OPL module not formed by the support layer is an ophthalmic lens or ophthalmic lens blank.
Figure 5:
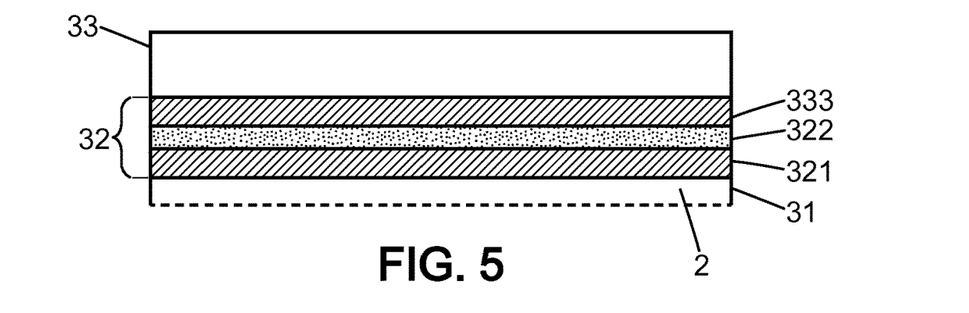
FIG. 5 is a cross section of an example of ECL module according to the invention.

The ECL module 3 generally comprises an electrochromic function layer (ECF layer) 32 between two end layers 31, 33. Thus, when saying that one face of the support layer 2 forms part of the ECL module 3, this means that the support layer 2 on that face forms one of the end layer 31 of the ECL module 33.

The ECF layer 32 may comprise a continuous transparent conductive layer (CTC layer) 321 directly in contact with on end layer 31 thereof. The ECF layer 32 may then further comprise an electrochromic medium 322 directly on and in contact with the CTC layer 321 on one side and with the other end layer 33 on the other side, this latter forming a protective layer. The electrochromic medium 322 may be a liquid crystal layer (LC layer), or a composition comprising electrochromic oxidizing compounds and/or reducing compounds in a solvent, such as those described in EP2848669, EP2848667, EP2848668 or EP2848670, or a solid state electrochromic layer, such as those described in WO2014121263 or WO2014113685. Solid state electrochromic layers may be obtained by deposition of a thin layer of at least one electrochromic compound on an electrically conductive substrate by electrodeposition or by a non-electrolytic route. Solid state electrochromic layers may include inorganic nanostructured layers made of $WO_3$, $V_2O_5$, $NiO$, $Ir_2O_3$, $MoO_2$, layers made of hexacyanometallates such as the hexacyanoferrates of iron (for example, Prussian blue), vanadium, ruthenium, cadmium, chromium, palladium or platinum. Solid state electrochromic layers may include organic compounds deposited on an electrically conductive substrate, such as viologens or conjugated polymers, such as polythiophene, and its derivatives, in particular poly(3,4-ethylenedioxythiophene), polypyrrole, polyaniline.

Optionally, the ECF layer 32 comprises a second CTC layer 323 between the medium 322 and the other end layer 33 so that the second CTC layer 323 is directly on and in contact with the electrochromic medium 322 on one side and with the other end layer 33 on the other side.

Each of the CTC layers 321, 323 may be chosen from derivatives of tin oxide, of indium oxide and of zinc oxide. Mention may be made in particular of fluorine-doped tin oxide (FTO, fluor tin oxide), tin-doped indium oxide (ITO, indium tin oxide), antimony-doped tin oxide and aluminium-doped zinc oxide. Tin-doped indium oxide (ITO) is particularly preferred.

Preferably each CTC layer 321, 323 presents a thickness of 10 nm to 10 000 nm. Intermediate lower and higher range values are 25 nm, 50 nm, 75 nm, 100 nm, 200 nm, 300 nm, 400 nm, 500 nm, 600 nm, 700 nm, 800 nm, 9000 nm, 1000 nm, 2500 nm, 5000 nm and 7500 nm. Preferably, the electrochromic medium 322 presents a thickness of 100 nm to 300 nm.

Each of the end layers 31, 33 may be independently in glass or plastic. Each of the end layers 31, 33 may be independently made of the same material as the support layer 2.

The end layers 31, 33 are at least partially transparent to visible light, preferably their transmittance is at least 10%, 15%, 20%, 25%, 30%, 35%, 40%, 45%, 50%, 55%, 60%, 65%, 70%, 75%, 80%, 85%, 90%. Preferably their transmittance is at most 100%, 95%, 90%, 85%, 80%, 75%, 70%, 65%, 60%, 55%, 50%, 45%, 40%, 35%, 30%, 25%, 20%, 15%, 10%.

Figure 6:
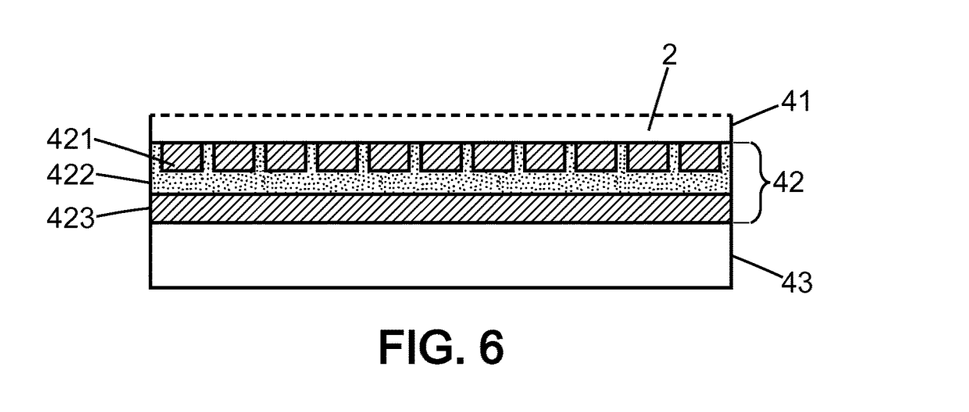
FIG. 6 is a cross section of an example of OPL module according to the invention.
Figure 7:
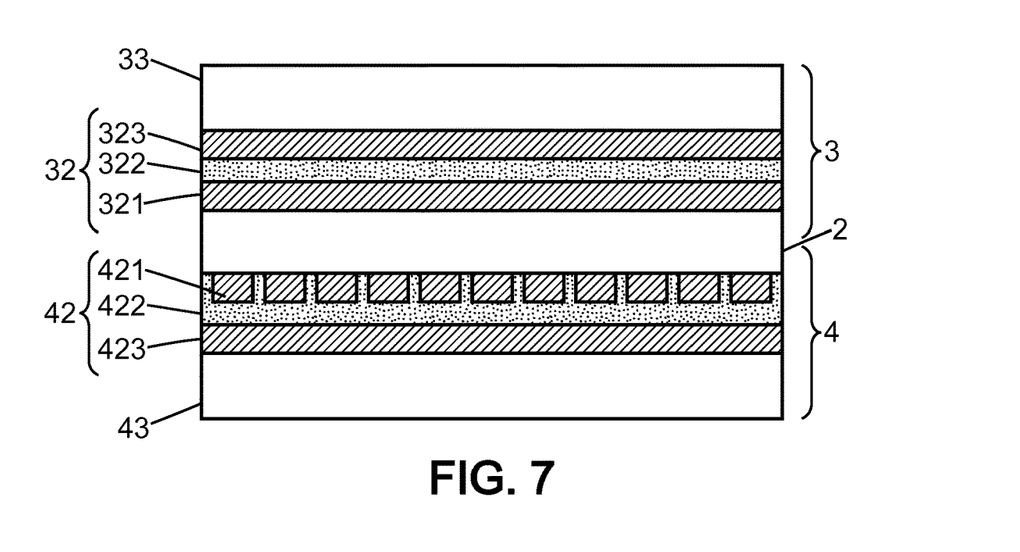
FIG. 7 is a cross section of a MF device according to the invention comprising the ECL module and OPL module of FIGS. 5 and 6.

The OPL module 4 generally comprises an ophthalmic power function layer (OPF layer) 42 between two end layers 41, 43. When saying that one face of the support layer 2 forms part of the OPL module 4, this means that the support layer 2 on that face forms one of the end layer 41 of the OPL module 4.

The OPF layer 42 may comprise a transparent conductive layer (TC layer) comprising transparent conductive first strips (TC1 strips) 421 oriented in a first direction directly in contact with the end layer 41 thereof, the TC1 strips 421 being parallel to one another. In which case, the OPF layer 42 may further comprise a second TC layer comprising transparent conductive second strips (TC2 strips) 423 oriented in a second direction perpendicular to the first direction, the TC2 strips 423 being parallel to one another. The OPF layer 42 further comprises a LC layer 422 directly between and in contact with both TC layers comprising TC strips 421, 423, the LC layer 422 also filling the space between the TC strips 421, 423. The other end layer 43 is directly on and in contact with the second TC layer comprising TC2 strips 423 and forming a protective layer.

Each of the end layers 41, 43 may be independently in glass or plastic, preferably it is made of the same material as the support layer. They are at least partially transparent to visible light, preferably their transmittance is at least 10%, 15%, 20%, 25%, 30%, 35%, 40%, 45%, 50%, 55%, 60%, 65%, 70%, 75%, 80%, 85%, 90%. Preferably their transmittance is at most 100%, 95%, 90%, 85%, 80%, 75%, 70%, 65%, 60%, 55%, 50%, 45%, 40%, 35%, 30%, 25%, 20%, 15%, 10%.

Each of the TC layers may be chosen from derivatives of tin oxide, of indium oxide and of zinc oxide. Mention may be made in particular of fluorine-doped tin oxide (FTO, fluor tin oxide), tin-doped indium oxide (ITO, indium tin oxide), antimony-doped tin oxide and aluminum-doped zinc oxide, a layer with a plurality of silver nanowire. Tin-doped indium oxide (ITO) is particularly preferred.

Preferably each TC strips 421, 423 presents a thickness of 10 nm to 10 000 nm. Intermediate lower and higher range values are 25 nm, 50 nm, 75 nm, 100 nm, 200 nm, 300 nm, 400 nm, 500 nm, 600 nm, 700 nm, 800 nm, 900 nm, 1000 nm, 2500 nm, 5000 nm and 7500 nm. Preferably each strips presents a width of 100 nm to 5000 nm. Intermediate lower and higher range values are 200 nm, 300 nm, 400 nm, 500 nm, 600 nm, 700 nm, 800 nm, 900 nm, 1000 nm, 1500 nm, 2000 nm, 2500 nm, 3000 nm, 3500 nm, 4000 nm and 4500 nm. Preferably, the LC layer 422 presents a thickness of 1 μm to 500 μm.

Alternatively, the OPL module 4 may comprise an OLED display or Micro Led display. Alternatively still, the OPL module 4 may comprise OLEDs printed on the support layer 2, preferably continuously scattered on the support layer 2. The OLEDs are preferably micro blue OLEDs.

The OPL module 4 mays be one of an electrofocus layered module (hereafter EFL module), a holographic mirror module (hereafter HM module) or a spatial light modulator module (hereafter SLM module).

"Holographic mirrors" (HM) are known in the art. The minor is defined as a holographic minor, if it was recorded using a holography process. But according to the invention, the holographic mirror is for visualization purposes. This mirror is used to reflect a light beam generated from an image source, so as to cause the visualization of the image by the wearer. The holographic minor is not used to reconstruct a recorded holographic image (as is the case in traditional hologram viewing). Due to the recording, advantageously according to the invention, the mirror is imparted an optical function, that is able, where applicable, to modify the wavefront of the light beam stemming from the image source upon reflection onto said mirror. This enables to correct the virtual vision of the wearer, because the lens of the invention (when incorporating the minor) can modify the light beam that generates the image in the eye of the wearer.

In some embodiments, the holographic minor (HM) comprises an array of individually tuneable recorded holographic pixels. For example, the array may be an array of polymer dispersed liquid crystals (PDLC) or of holographic polymer dispersed liquid crystals (H-PDLC). In such embodiments, the pixel size may be at least 50 μm.

The virtual image is thus not necessarily a holographic image. It can be any virtual image, such as a 2D or 3D image. The nature of the image results from the nature of the image source, not from the holographic nature of the holographic mirror. It is possible to use, as an image source, a holographic image source, in which case the virtual image is a holographic image.

The mirror used in accordance with the invention is tunable, in that one or more of its optical properties, for one or more parts or areas of said mirror, can be tuned. This means that said one or more optical properties can be adjusted, activated, deactivated, switched (ON or OFF), and/or synchronized with the image source, etc.

Optical properties include optical index value, phase, reflectivity (value, angle, wavelengths or spectral curve), transmittance, etc.

"Spatial light modulators" (SLM) are known in the art. Said SLM can be a phase SLM, a phase-only SLM, an amplitude-only SLM, or a phase and amplitude SLM. Where present, the amplitude modulation is preferably independent from the phase modulation, and allows for a reduction in the image speckle, so as to improve image quality in terms of levels of grey. In preferred embodiments, the SLM is a phase or a phase-only SLM. According to the invention, the SLM acts as a 'programmable' hologram, namely an electronically addressable reading support that allows the display of the desired holographic image.

Preferably, the OPL module 4 presents a position on the lower part of the support layer 2, while the ECL module 3 presents a position on the upper part of the support layer 2 or covers the latter entirely (thus overlapping with the OPL module 4). The ECL module and the OPL module are said to overlap when their projections perpendicularly to the average plane of the support layer onto a same plane overlap on that latter plane. The separator(s) may be made of optical glue.

Figure 8:
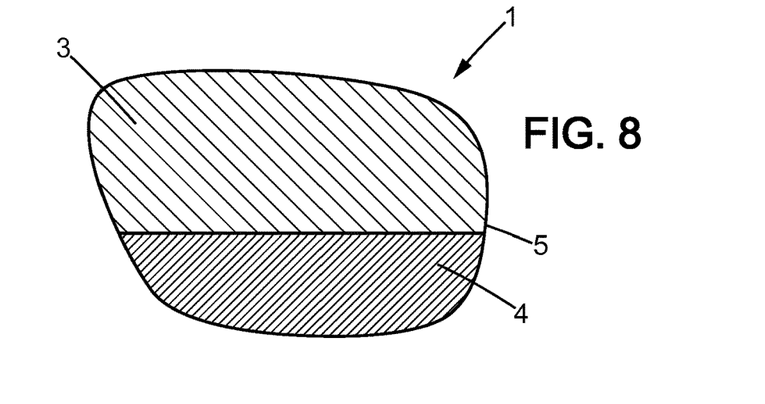
FIG. 8 is a front view of a MF device according to the invention wherein the ECL module and the OPL module are formed on the same face of the support layer and wherein the ECL module is at an upper part of an ophthalmic lens or ophthalmic lens blank and the OPL module at the lower part thereof.
Figure 9:
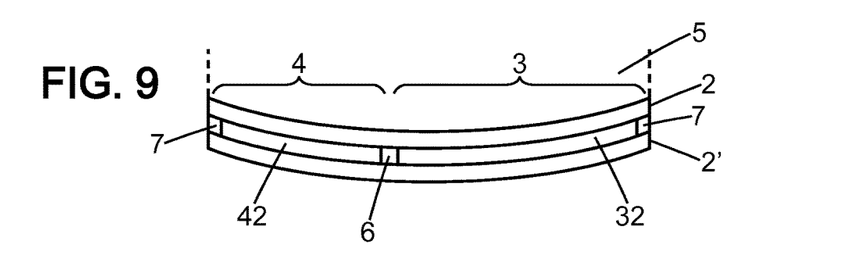
FIG. 9 is a cross section of the MF device of FIG. 8 along a plane that intersect both the ECL module and the OPL module.

The same face of the support layer 2, e.g. the front face or the back face thereof, may form both part of the ECL module 3 and part of the OPL module 2. In other words, the EC part and the OP part are both on the same face of the support layer 2. In this configuration, the ECL module 3 and the OPL module 4 preferably share their end layers 31, 41. In this case, the ECF layer 32 of the ECL module 3 and the OPF layer 42 of the OPL module 4 may be separated at their lateral edges through a separator 6, preferably a liquid-tight separator, or by a gap of gas, such as air, or material, such as the same material as that of the support layer 2; each of the ECF layer 32 of the ECL module 3 and OPF layer 42 of the OPL module 4 being separated from the gap by a separator 6, preferably an air-tight and liquid-tight separator.

In this case, there is usually another support layer 2' forming both part of the ECL module 3 and OPL module 4 (notably their other end layers 33, 43) so that they are sandwiched between both support layers 2, 2'.

Alternatively, one face of the support layer 2 forms part of the ECL module 3 and the other face of the support layer 2 forms part of the OPL module 4. In other words, the EC part is on one face of the support layer 2 and the OP part in on the other. In this latter configuration, the support layer 2 is an intermediate support layer. The position of the EC part may be at the front and the position of the OP part at the back. Alternatively, the position of the EC part is at the back and the position of the OP part at the front.

The EC part may cover the entire corresponding face or only part thereof. Alternatively or additionally, the OP part may cover the entire corresponding face or only part thereof.

The ECL module 3 may further comprise a printed light sensor. The light sensor makes it possible to tune the electrochromic effect based on the environment's lighting. Indeed, usually if the environment's lighting is low, the electrochromic effect needs to be deactivated. In which case, the ECL module 3 may further comprise a processor connected to the light sensor. Additional or alternatively, the OPL module 4 may further comprise a controller connected to the light sensor of the ECL module 3 which is adapted to control the ophthalmic power according to the light received by the light sensor. In this latter case, the controller may be connected to the light sensor through the electric connections of the support layer. For example, the controller may be connected to the light sensor by direct wires soldered on the ECL module and/or OPL module or by flex cable and connectors that are previously soldered on the ECL module and/or OPL module. Controller may alternatively be integrated directly on the ECL module and/or OPL module, and connected to other active component and light sensor by ITO or other printed conductive wires.

The light sensor may be any light sensor known to the skilled person.

Ambient light sensor like Rohm BH1721FVC could be used, or more complex light sensors as AS7264 from AMS where different light wavelength can be analyzed, that enable to adapt the EC function to different colour light.

The support layer 2 is typically a single block of material. The support layer may be in glass or plastic.

The support layer 2 may be a thin layer of material, the purpose of which is dedicated to the support of the ECL module 3 and OPL module 4. In this case, the thickness of the thin layer of material forming the support layer 2 may be 50 µm to 2000 µm. Intermediate lower and higher range values may be 100 µm, 200 µm, 300 µm, 400 µm, 500 µm, 600 µm, 700 µm, 800 µm, 900 µm, 1000 µm, 1250 µm, 1500 µm and 1750 µm. Particularly, its thickness is between 100 µm and 1000 µm when the ECL part and the OPL part are on the same face of the support layer. Particularly, its thickness is between 300 µm and 1000 µm when the ECL part and the OPL part are on opposite faces of the support layer.

The whole assembly, support layer 2 with the ECL module 3 and OPL module 4 is then attached to an ophthalmic lens or ophthalmic lens blank 5, either at the front face or at the back face thereof. That is to say either the other end layer 33, 43 of the ECL module 3 or OPL module 4 not being the support layer is attached to the ophthalmic lens or ophthalmic lens blank 5, typically with optical glue.

Alternatively, the support layer 2 may be at least part or the whole part of the substrate of an ophthalmic lens or ophthalmic lens blank 5. The ECL module 3 and OPL module 4 may be on the front face or the back face thereof. When the ECL module 3 and the OPL module 4 are on two different side of the support layer 2, one can be on the front face of the ophthalmic lens or ophthalmic lens blank and the other on the back face thereof.

The support layer 2 may comprise a recess 21 (for example see FIG. 13) on one of its face to house the other elements of the ECL module 3 and/or OPL module 4 so that the corresponding module is fully housed inside the recess 21 of the support layer 2. In this case, either the support layer 2 forms both end layers 31, 33; 41, 43 of the corresponding module (thus embedding the corresponding module) or only one end layer 31, 41 and the other end layer 33, 43 is a protective layer.

The support layer 2 may comprise an excess of thickness 22 (for example see FIG. 14) on one of its face to support the other elements of the ECL module 3 and/or OPL module 4 so that the corresponding module is somewhat raised. This is particularly advantageous when the support layer 2 is a thin layer of material and that the assembly of support layer 2, ECL module 3 and OPL module 4 is to be attached to an ophthalmic lens or ophthalmic lens blank 5 with a recess 51 on its face to be attached to the face of the support layer 2 presenting the excess of thickness 22.

The support layer 2 comprises electric connections to the ECL module 3 and the OPL module 4. The electric connections may be provided on at least one side edge of the support layer. These electric connections may be configured for various purposes such as powering the ECL module 3 and the OPL module 4. They can also be configured for connections to other devices and/or mutual connection between both modules, for example for a communication purpose. An electric connection may be provided only at one side edge of the support layer. Electric connections may also be provided across the face of the support layer on which the ECL module 3 and/or the OPL module 4 is provided, for example for connecting a plurality of ECL modules 3 and/or OPL modules 4.

The support layer 2 may also be a patterned or engraved intermediate support layer such that one or both of its faces present a pattern, preferably a micrometric pattern, notably for providing the support layer with electric wires and connections or electric components that can be created through surface patterning or engraving such as signal transmitter, polariser, transistor, sensor, isolator, and any active optic, for example electrochromic material, phase changing material and more. Technologies for patterning or engraving a surface are known. Among those available, the following ones are worth mentioning:

standard technologies for liquid crystal display such as photolithography, laser engraving, chip on glass mounting and soldering for active components soldering on substrate; and electronic printing technologies such as aerosol printing, ink projection.

In ink projection, the ink may comprise a graphene based conductor or is a silver ink for printing silver nanowires acting like ITO (Indium Tin Oxyde).

The invention also provides an ophthalmic lens or ophthalmic lens blank 5 comprising the MF device 1 described above. The MF device 1 may cover all or only part of the ophthalmic lens or ophthalmic lens blank 5. When it covers the entire ophthalmic lens or ophthalmic lens blank 5, the support layer is preferably the ophthalmic substrate itself. The side edge of the support layer 2 may be flush with the side edge of the ophthalmic lens or ophthalmic lens blank 5.

The invention also provides a spectacle comprising at least one ophthalmic lens described above.

The invention further provides a method for manufacturing a MF device described above. The method comprises:

providing an ECL module onto an EC part of one face of the support layer;

providing an OPL module onto an OP part of one face of the support layer.

Providing an ECL module may comprise providing a CTC layer directly on and in contact with the EC part. The step may further comprise a LC layer directly on and in contact with the CTC layer, a second CTC layer directly on and in contact with the LC layer, and a protective layer directly on and in contact with the second CTC layer.

Providing an OPL module may comprise patterning the support layer with a transparent conductive layer comprising TC strips oriented in a first direction directly in contact with the part of the corresponding face of the support layer. Providing an OPL module may further comprise providing a second TC layer comprising TC strips oriented in a second direction perpendicular to the first direction, a LC layer directly between and in contact with both TC layers comprising TC strips, the LC layer also filling the space between the strips, and a protective layer directly on and in contact with the second TC layer comprising TC strips.

EXAMPLES

Example 1—ECL Module/ISL/EFL Module

In Example 1, the MF device comprises a support layer, an ECL module on one face of the support layer and an OPL module which is an EFL module, on another face of the support layer opposite to the one face, the support layer being an intermediate support layer.

The ECL module, apart from the one face of the support layer, further comprises a CTC layer, for example ITO, over the entire one face of the support layer and directly contacting the one face and acting as a first electrode. The ECL module also comprises a LC layer directly contacting the CTC layer and entirely covering it, and a protective layer, preferably made of the same material as the support layer, contacting the LC layer and entirely covering it.

The ECL module further comprises a second electrode which may be a CTC layer or a TC layer comprising TC strips.

The ECL module preferably comprises a light sensor.

The EFL module, apart from the other face of the support layer, further comprises a transparent conductive layer comprising a plurality of transparent conductive strips, such as ITO strips or silver nanostrips, the strips being parallel to one another along a given direction. The EFL module also comprises a LC layer entirely covering the transparent conductive layer, directly contacting it, and filing the gaps between the transparent conductive strips. The EFL module further comprises a protective layer, preferably made of the same material as the support layer, contacting the LC layer and entirely covering it.

Last, a controller is connected by wires and/or connectors to the active parts (ECL and EFL modules), or embedded partially or completely on the glass (for example the battery can be separated and connected through wires). This controller contains a battery or energy source, like supercapacitor, a processor and connection means to the ECL and EFL modules. Processor can be a display controller, a general purpose processor, a FPGA (Field Programmable Gate Array) or a custom designed application-specific integrated circuit (ASIC).

Example 2—Backlight/ISL/LCD

In Example 2, the MF device comprises a support layer, an ECL module on one face of the support layer and an OPL module on another face of the support layer opposite to the one face.

In this example, the OPL module provides the backlight function. Thus, no supplementary back light module is needed. The ECL module provides the liquid crystal function.

The OPL module, apart from the other face of the support layer, comprises a plurality of OLEDs printed on the other face of the intermediate support and homogeneously scattered through the surface thereof.

The ECL module, apart from the one face of the support layer, comprises a TC layer comprising a plurality of TC strips, such as ITO strips or silver nanostrips, the strips being parallel to one another along a first given direction. The ECL module further comprises another TC layer comprising a plurality of TC strips, such as ITO strips or silver nanostrips, the strips being parallel to one another along a second given direction intersecting the first given direction, preferably perpendicularly.

Last, a controller as described in Example 1 is provided.

Example 3—Light Therapy

In Example 3, the MF device may be used for light therapy. It comprises a support layer, an ECL module on one face of the support layer and an OPL module on another face of the support layer opposite to the one face.

The ECL module is the same as in Example 1 but without light sensor.

The OPL module, apart from the other face of the support layer, further comprises a plurality of micro-sized blue micro LEDs on the other face of the intermediate support and homogeneously scattered through the surface thereof.

The micro LEDs have a size of about 10 µm and as such they are almost if not entirely invisible to the wearer.

This MF device preferably forms a multifunctional ophthalmic lens that provides not only blue light therapy but also reduces the light entering the wearer's eye when sunlight is strong or in the evening when the amount of blue light entering the wearer's eye must be reduced or even avoided to facilitate melatonin synthesis for easy sleep.

A controller as described in Example 1 is provided.

In order to improve functionality of the MF device, a light sensor may be provided to better regulate the level of light provided by the MF device according to external light and/or time of the day, for example to provide a chronobiology cycle regulation.

Example 4—OLED Display

In Example 4, the MF device comprises a support layer, an ECL module on one face of the support layer and an OPL module on another face of the support layer opposite to the one face.

The ECL module is the same as in Example 1.

The OPL module, apart from the other face of the support layer, further comprises a transparent OLED display.

OLED display can be printed directly on the plastic substrate, or on glass substrate. Micro Led display can be produced with more complex means that are at the moment under development.

The support layer comprises a processor, preferably soldered on its side edge. The processor is connected to the light sensor and controls the ECL module to tune its darkening based on the signal of the light sensor, which is indicative of the lighting conditions, so that the ECL module is activated on when the light sensor detect a high level of light, in order to enhance the display contrast.

A controller as described in Example 1 is provided to address each pixel of the display and control the ECL module.

Example 4bis—Holographic Mirror Display

In this example, all elements are the same as in Example 4 but the OPL module is a holographic mirror.

Example 4ter—Spatial Light Modulator Display

In this example, all elements are the same as in Example 4 but the OPL module is a spatial light modulator.

Example 5 (FIGS. 8 and 9)

In Example 5, the MF device 1 comprises an ophthalmic lens or ophthalmic lens blank 5, an ECL module 3 and an OPL module 4. A first support layer 2 is in contact with the front face of the ophthalmic lens or ophthalmic lens blank 5 on one of its face. An ECF layer 32 is in contact with the other face of the first support layer 2 and an OPF layer 42 with the same other face of the first support layer 2 so that the first support layer 2 forms one end layer 31, 41 of each of the ECL module 3 and OPL module 4. A second support layer 2' is in contact with the ECF layer 32 and the OPF layer 42 forming the other end layer 33, 43 of each of the ECL module 3 and OPL module 4. A separator 6 formed by optical glue is placed between the ECF layer 32 and the OPF layer 42. Further amount of optical glue is used to completely seal the function layers 32, 42 from the external environment.

In this example 5, the ECL module 3 covers the entire upper part of the ophthalmic lens or ophthalmic lens blank 5 and the OPL module 4 covers the entire lower part thereof.

The separation between both modules 3, 4 is substantially horizontal when considering the ophthalmic lens or ophthalmic lens blank 5 in their normal wearing position. The height of the upper part forms 50 to 65% of the height of the ophthalmic lens or ophthalmic lens blank, the rest being the lower part.

Alternatively, in an example not illustrated, the first support layer 2 and the ophthalmic lens or ophthalmic lens blank 5 are together a unique block of material.

Figure 10:
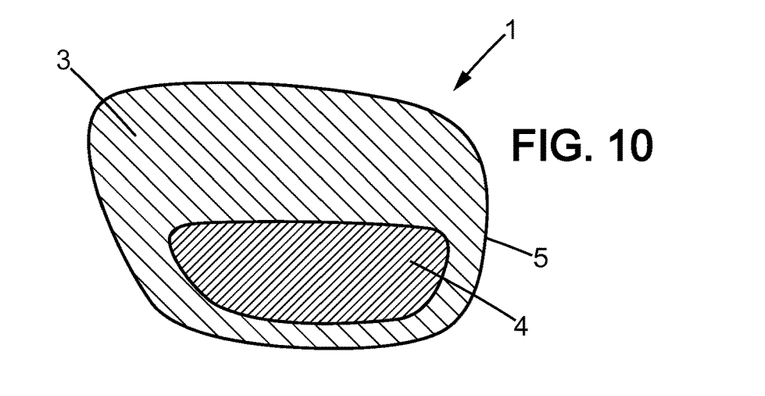
FIG. 10 is a front view of a MF device according to the invention wherein the ECL module and the OPL module are formed on the same face of the support layer and wherein the ECL module is at an upper part of an ophthalmic lens or ophthalmic lens blank and the OPL module at the lower part thereof and surrounded by the ECL module.
Figure 11:
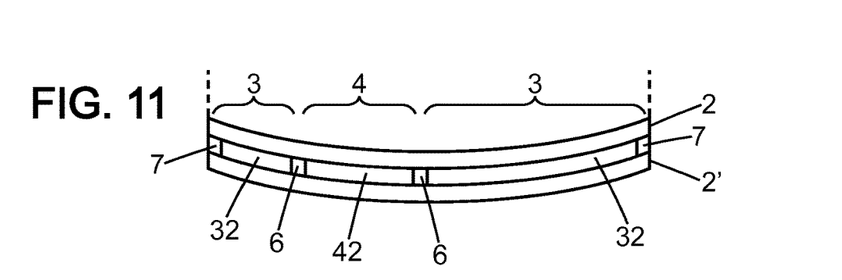
FIG. 11 is a cross section of the MF device of FIG. 10 along a plane that intersect both the ECL module and the OPL module.

Example 6 (FIGS. 10 and 11)

In Example 6, the MF device 1 has the same structure than that of example 5, except the following.

The OPF layer 42 is surrounded by the ECF layer 32 so that the OPL module 4 is surrounded by the ECL module 3.

The OPL module 4 covers a portion of the lower part of the ophthalmic lens or ophthalmic lens blank 5 leaving a strip of ECL module 3 at the lowest part thereof. The OPL module 4 has typically the shape of the smaller and lower lens of a bifocal ophthalmic lens with necessarily having the same function.

Alternatively, in an example not illustrated, the first support layer 2 and the ophthalmic lens or ophthalmic lens blank are together a unique block of material.

Figure 12:
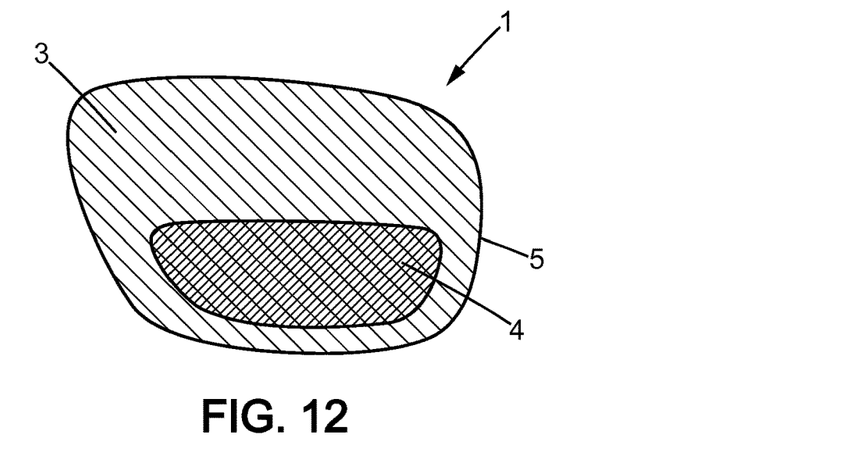
FIG. 12 is a front view of a MF device according to the invention wherein the ECL module and the OPL module are formed on opposite faces of the support layer and are overlapping one another and wherein the ECL module is at an upper part of an ophthalmic lens or ophthalmic lens blank and the OPL module at the lower part thereof and surrounded by the ECL module.
Figure 13:
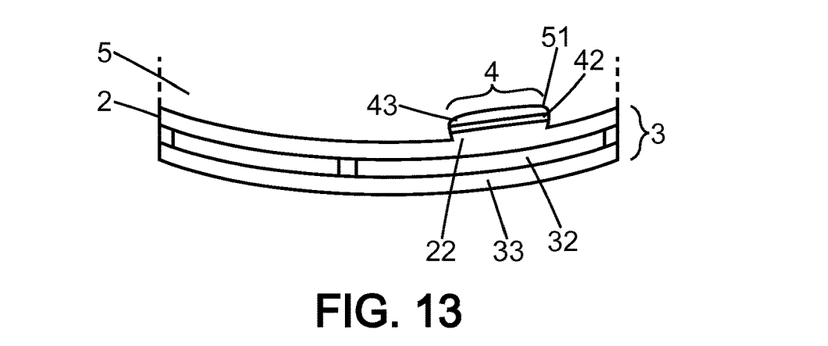
FIG. 13 is a cross section of the MF device of FIG. 12 according to one embodiment, wherein the OPL module is housed in a recess of the ophthalmic lens or ophthalmic lens blank.

Example 7 (FIGS. 12 and 13)

In Example 7, the MF device 1 comprises an ophthalmic lens or ophthalmic lens blank 5, ECL module 3 and an OPL module 4. The ophthalmic lens or ophthalmic lens blank 5 presents at its front face a recess 51.

A intermediate support layer 2 is in contact fully on one of its faces with an ECF layer 32 (here front face). A portion of its other face (here back face) presents an excess of thickness 22 in contact with an OPF layer 42. The ECF layer 32 is further in contact with a second support layer 33 opposite to the intermediate support layer 2 and which covers it entirely. The OPF layer 42 is also in contact with a third support layer 43 that covers it entirely.

The intermediate support layer 2, the ECF layer 32 and the second support layer 33 form the ECL module 3.

The excess of thickness 22, the OPF layer 42 and the third support layer 43 form the OPL module 4.

The thickness of OPL module 4 is equal to the depth of the recess 51 on the front face of the ophthalmic lens or ophthalmic lens blank 5 so that the recess can house the OPL module 4 and at the same time the front face of the ophthalmic lens or ophthalmic lens blank 5 is in contact with the intermediate support layer 2.

Thus, the OPL module 4 overlaps over its entire surface the ECL module 3.

Alternatively, in an example not illustrated, the third support layer 43 and the ophthalmic lens or ophthalmic lens blank 5 are together a unique block of material.

Alternatively still, in an example not illustrated, the intermediate support layer 2, the third support layer 43 and the ophthalmic lens or ophthalmic lens blank 5 are together a unique block of material. In this latter example, the OCL module 4 is entirely embedded in the ophthalmic lens or ophthalmic lens blank 5.

Figure 14:
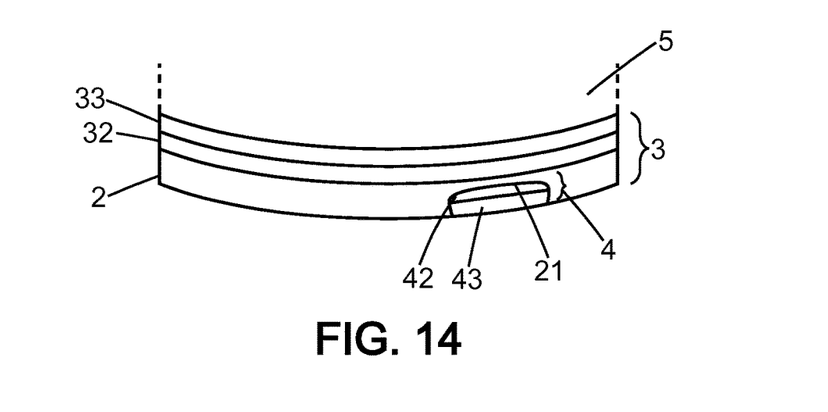
FIG. 14 is a cross section of the MF device of FIG. 12 according to another embodiment, wherein the OPL module is housed in a recess of the support layer.

Example 8 (FIGS. 12 and 14)

In example 8, the MF device 1 comprises an ophthalmic lens or ophthalmic lens blank 5, ECL module 3 and an OPL module 4.

An intermediate support layer 2 is in contact fully on one of its faces with an ECF layer 32 (here back face). The other face (here front face) of the intermediate support layer 2 presents a recess 21 over a portion thereof. An OPF layer 42 is in contact with the surface of the recess 21 and covers it entirely.

The ECF layer 32 is further in contact with a second support layer 33 opposite to the intermediate support layer 2 and which covers it entirely thus forming an ECL module 3. The OPF layer 42 is also in contact with a third support layer 43 that covers it entirely thus forming an OPL module 4.

The added thickness of the OPF layer 42 and third support layer 43 equals to the depth of the recess 21 of the intermediate support layer 2.

The second support layer 33 is attached to the front face of the ophthalmic lens or ophthalmic lens blank 5, e.g. with optical glue.

Alternatively, the third support layer 43 and the intermediate support layer 2 are together a unique block of material. In this latter example, the OCL module 4 is entirely embedded in the intermediate support layer.

Any ECL module of the examples 1 to 8 may be combined with any of the OPL module of the examples 1 to 4, depending on the desired effect.

The invention claimed is:

1. A multifunctional device for an ophthalmic lens or ophthalmic lens blank, the multifunctional device comprising a support layer, an electrochromic layered module, and an electrofocus layered module,
   wherein:
   a part of one face of the support layer, called EC part, forms part of the electrochromic layered module;
   a part of one face of the support layer, called OP part, forms part of the ophthalmic power layered module;
   the support layer comprises electric connections to the electrochromic layered module and the ophthalmic power layered module, and
   wherein the electrofocus layered module comprises a transparent conductive layer with transparent conductive strips oriented in a first direction directly in contact with the OP part.

2. The multifunctional device of claim 1, wherein an EC-part-bearing face of the support layer and an OP-part-bearing face of the support layer are opposite faces of the support layer.

3. The multifunctional device of claim 1, wherein the electrochromic layered module comprises a continuous transparent conductive layer directly in contact with the EC part.

4. The multifunctional device of claim 3, wherein the electrochromic layered module further comprises an electrochromic medium directly on the continuous transparent conductive layer, a second continuous transparent conductive layer directly on the electrochromic medium, and a protective layer directly on the second continuous transparent conductive layer.

5. The multifunctional device of claim 4, wherein the electrochromic medium is one of a liquid crystal layer (LC layer), a solid state electrochromic layer, a composition comprising, in a solvent, electrochromic oxidizing compounds and/or reducing compounds.

6. The multifunctional device of claim 5, wherein the electrochromic medium is a liquid crystal layer.

7. The multifunctional device of claim 5, wherein the electrochromic medium is a composition comprising, in a solvent, electrochromic oxidizing compounds and/or reducing compounds.

8. The multifunctional device of claim 1, wherein the electrochromic medium is a composition comprising, in a solvent, electrochromic oxidizing compounds and/or reducing compounds and wherein the ophthalmic power layered module is a holographic mirror module.

9. The multifunctional device of claim 1, wherein the ophthalmic power layered module further comprises a second transparent conductive layer comprising transparent conductive strips oriented in a second direction perpendicular to the first direction, a liquid crystal layer directly between both transparent conductive layers comprising transparent conductive strips, the liquid crystal layer also filling the space between the strips, and a protective layer directly on the second transparent conductive layer comprising transparent conductive strips.

10. The multifunctional device of claim 1, wherein the electric connections are provided on at least one side edge of the support layer.

11. The multifunctional device of claim 1, wherein the electrochromic layered module further comprises a printed light sensor.

12. The multifunctional device of claim 11, wherein the ophthalmic power layered module further comprises a controller connected to the light sensor of the electrochromic layered module which is adapted to control the ophthalmic power according to the light received by the light sensor.

13. The multifunctional device of claim 12, wherein the controller is connected to the light sensor through the electric connections of the support layer.

14. The multifunctional device of claim 1, wherein the electrochromic layered module further comprises a processor connected to the light sensor.

15. An ophthalmic lens or ophthalmic lens blank, comprising the multifunctional device of claim 1.

16. The ophthalmic lens or ophthalmic lens blank of claim 15, wherein the side edge of the support layer is flush with the side edge of the ophthalmic lens or ophthalmic lens blank.

17. A spectacle, comprising at least one ophthalmic lens according to claim 15.

18. A method for manufacturing a multifunctional device according to claim 1, the method comprising:
   forming an electrochromic layered module onto a part of one face of the support layer, called EC part, by attaching the element of the electrochromic layered module thereto; and
   forming an electrofocus layered module comprising a transparent conductive layer with transparent conductive strips oriented in a first direction onto a part of one face of the support layer, called OP part, by directly contacting the transparent conductive strips with the OP part.

* * * * *